(12) United States Patent
Ishida et al.

(10) Patent No.: US 11,318,576 B2
(45) Date of Patent: May 3, 2022

(54) COMPONENT PRODUCTION METHOD AND COMPONENT PRODUCTION SYSTEM

(71) Applicant: MITSUBISHI HEAVY INDUSTRIES, LTD., Tokyo (JP)

(72) Inventors: Makoto Ishida, Tokyo (JP); Yuji Ito, Tokyo (JP); Kazushi Hasegawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 614 days.

(21) Appl. No.: 16/349,080

(22) PCT Filed: Oct. 16, 2017

(86) PCT No.: PCT/JP2017/037385
§ 371 (c)(1),
(2) Date: May 10, 2019

(87) PCT Pub. No.: WO2018/088139
PCT Pub. Date: May 17, 2018

(65) Prior Publication Data
US 2019/0275630 A1    Sep. 12, 2019

(30) Foreign Application Priority Data
Nov. 11, 2016   (JP) .............................. JP2016-220428

(51) Int. Cl.
*B23P 19/04*    (2006.01)
*B23Q 17/22*    (2006.01)
(Continued)

(52) U.S. Cl.
CPC .......... *B23Q 17/2233* (2013.01); *B23B 39/06* (2013.01); *B23B 39/08* (2013.01);
(Continued)

(58) Field of Classification Search
CPC ........ B23Q 17/2233; B23Q 3/02; B23Q 3/06; B23Q 17/22; B23Q 2703/10; B23Q 3/00;
(Continued)

(56) References Cited

U.S. PATENT DOCUMENTS 5,910,894 A * 6/1999 Pryor ............... G05B 19/41875
700/95
2004/0038787 A1    2/2004 Watanabe
(Continued)

FOREIGN PATENT DOCUMENTS

CN      104440155 A    3/2015
JP      H05-031836 U   4/1993
(Continued)

OTHER PUBLICATIONS

International Search Report in corresponding International Application No. PCT/JP2017/037385, dated Dec. 26, 2017 (5 pages).
(Continued)

*Primary Examiner* — Nirvana Deonauth
(74) *Attorney, Agent, or Firm* — Osha Bergman Watanabe & Burton LLP (57) ABSTRACT

A component production method includes: a step of binding a long frame by a plurality of support devices arranged along the frame; a step of measuring, with a distance sensor, a distance to the frame supported by the plurality of support devices; a step in which, based on frame shape data prerecorded in a memory, the support devices move support positions where the frame is supported so that a calculated radial position of the frame being supported by the support devices matches the data about the frame shape; a step of fixing the frame in a state in which the data about the frame shape matches the radial position of the frame; and a step of performing a hole-making operation on the fixed frame.

4 Claims, 6 Drawing Sheets

(51) Int. Cl.
*B23Q 3/06* (2006.01)
*B23Q 3/02* (2006.01)
*B23B 39/08* (2006.01)
*B23B 39/06* (2006.01)
*B24B 11/02* (2006.01)
*B24B 5/14* (2006.01)
*B24B 5/02* (2006.01)
*B25B 11/02* (2006.01)
*B25B 5/02* (2006.01)
*B25B 5/12* (2006.01)
*B25B 5/14* (2006.01)
*B23B 35/00* (2006.01)

(52) U.S. Cl.
CPC ............... *B23P 19/04* (2013.01); *B23Q 3/02* (2013.01); *B23Q 3/06* (2013.01); *B23Q 17/22* (2013.01); *B24B 5/02* (2013.01); *B24B 5/14* (2013.01); *B24B 11/02* (2013.01); *B25B 5/02* (2013.01); *B25B 5/12* (2013.01); *B25B 5/14* (2013.01); *B25B 11/02* (2013.01); *B23B 35/00* (2013.01); *B23B 2270/48* (2013.01); *B23Q 2703/10* (2013.01)

(58) Field of Classification Search
CPC ........ B23Q 3/061; B23Q 3/063; B23Q 3/154; B23Q 5/00; B23Q 16/00; B23B 39/06; B23B 39/05; B23B 35/00; B23B 2270/48; B24B 5/02; B24B 5/14; B24B 11/02; B25B 5/02; B25B 5/12; B25B 5/14; B25B 11/02; B23P 19/04
See application file for complete search history.

(56) References Cited

U.S. PATENT DOCUMENTS

2018/0104777 A1* 4/2018 Tombe ................... B21J 15/142
2019/0143399 A1* 5/2019 Kasahara ............... B25J 19/023
29/525.06

FOREIGN PATENT DOCUMENTS

| JP | H06-126567 A | 5/1994 |
| JP | 2004-082242 A | 3/2004 |
| JP | 2006-110635 A | 4/2006 |
| JP | 2012-106304 A | 6/2012 |

OTHER PUBLICATIONS

Written Opinion in corresponding International Application No. PCT/JP2017/037385, dated Dec. 26, 2017 (6 pages).

* cited by examiner

COMPONENT PRODUCTION METHOD AND COMPONENT PRODUCTION SYSTEM

TECHNICAL FIELD

The present invention relates to a component production method and a component production system, and more particularly to a component production method and a component production system for producing a long member (frame) constituting an aircraft component.

BACKGROUND ART

Aircraft components such as a fuselage and a main wing are produced by, for example, fastening frames or stringers to a plate-like member (skin) with rivets to unite the members together. Conventionally, when assembling these members, in a state in which the skin is fixed to a table-like jig, frames or stringers positioned by another positioning jig are placed over the skin and then temporarily fastened to the skin with rivets for temporary fastening. After the temporary fastening is completed and an inspection is finished, permanent rivets are fastened at predetermined rivet fastening positions. Consequently, an aircraft component in which the skin, the frames and the stringers are united together is produced.

PTL 1 listed below discloses a technique of enabling positioning and clamping a workpiece having a free curved surface, such as a frame component of an aircraft, by only one type of apparatus without requiring hundreds types of jigs which are conventionally required.

CITATION LIST

Patent Literature

[PTL 1] Japanese Unexamined Patent Application, Publication No. Hei6-126567

SUMMARY OF INVENTION

Technical Problem

Since the fuselage of an aircraft has a circular cross section and the diameter of the circular shape changes along the axial direction of the aircraft, there are a variety of types of skin, frame and stringer. Therefore, when forming positioning holes in arc-shaped components such as frames, a great number of types of fixing jigs for fixing the frames during machining need to be prepared in advance according to the shapes of the frames.

The present invention has been made in view of the above circumstances, and it is an object of the present invention to provide a component production method and a component production system capable of fixing many types of members without preparing many types of jigs, and capable of performing machining with respect to the fixed members.

Solution to Problem

A component production method according to a first aspect of the present invention includes: a step of supporting a long first member by a plurality of support parts arranged spaced apart from each other along the first member; a step of detecting, by a detection unit, information about a shape of the first member supported by the plurality of support parts; a step in which, based on the information about the shape of the first member detected by the detection unit and shape data of the first member prerecorded in a storage unit, the support parts move support positions where the first member is supported so that the first member supported by the support parts matches the shape data of the first member; a step of fixing the first member in a state in which the information about the shape of the first member detected by the detection unit matches the shape data of the first member; and a step of performing machining with respect to the fixed first member.

According to this configuration, the long first member is supported by the plurality of support parts arranged spaced apart from each other along the first member, and the information about the shape of the first member supported by the plurality of support parts is detected by the detection unit. As the support parts change the support positions where the first member is supported, it is possible to change the shape of the first member supported by the support parts. Then, based on the information about the shape of the first member detected by the detection unit and the shape data of the first member prerecorded in the storage unit, the support parts move the support positions where the first member is supported so that the first member supported by the support parts matches the shape data of the first member. Then, in a state in which the information about the shape of the first member detected by the detection unit matches the shape data of the first member, the first member is fixed, and machining is performed with respect to the first member. The machining is, for example, a hole-making operation for forming a through-hole into which a rivet is to be inserted.

In the first aspect, before the step of supporting the first member by the plurality of support parts, a step of changing mount positions of the support parts according to the shape of the first member may be included.

According to this configuration, before the first member is supported by the plurality of support parts, the mount positions of the support parts are changed according to the shape of the first member in advance. In short, even when supporting the first member of a different shape, it is possible to support the first member by changing the mount positions of the support parts.

In the first aspect, it may be possible to include a step of guiding both side surfaces of the first member or upper and lower surfaces of the first member along a circumferential direction of the first member by clamps provided on the support parts, and a step of fixing the first member by sandwiching both the side surfaces of the first member or the upper and lower surfaces of the first member by the clamps.

According to this configuration, both of side surfaces of the first member or the upper and lower surfaces of the first member are guided along the circumferential direction of the first member by the clamps provided on the support part. Hence, when the support position is changed by the support part, the first member is guided along the clamps, and it is possible to prevent the first member from being deformed in a direction different from the original shape due to application of excessive force. Moreover, the first member is fixed by sandwiching both of the side surfaces of the first member or the upper and lower surfaces of the first member by the clamps, thereby preventing movement and deformation of the first member during machining.

A component production system according to a second aspect of the present invention includes: a plurality of support parts arranged spaced apart from each other along a long first member and supporting the first member; a detection unit for detecting information about a shape of the first member supported by the support parts; a storage unit in which shape data of the first member is prerecorded; a drive control unit for driving, based on the information about the shape of the first member detected by the detection unit and the shape data of the first member prerecorded in the storage unit, the support parts to move support positions where the support parts support the first member, so that the first member supported by the support parts matches the shape data of the first member; and a machining unit for performing machining with respect to the first member, wherein the drive control unit stops driving of the support parts in a state in which the information about the first member detected by the detection unit matches the shape data of the first member, and the support parts fix the first member.

Advantageous Effects of Invention

According to the present invention, many types of components can be fixed without preparing many types of jigs, and machining, such as making a through-hole, can be performed with respect to a fixed member. As a result, it is possible to reduce the time and cost required for preparing production.

DESCRIPTION OF EMBODIMENTS

Hereinafter, an embodiment of the present invention will be described with reference to the drawings.

In an aircraft component production system 1 according to one embodiment of the present invention, when assembling an aircraft component, each of a plurality of types of frames which are long members to be machined can be fixed regardless of the shape, for example, curvature of the frame, and it is possible to perform machining, such as hole-making, with respect to the fixed frame. Here, the aircraft component is, for example, a fuselage or a main wing of an aircraft.

If the aircraft component is a fuselage, a skin has an arc shape in a cross section cut perpendicularly to the axial direction of the aircraft. The frame is a member arranged along the circumference of the skin, and has a circular arc shape with a curvature. A stringer is a member that is arranged on the skin to be parallel to the axial direction of the aircraft, and is a linear member. By attaching the frames or the stringers to the skin, an aircraft component such as a fuselage is produced.

At this time, positioning of the frame or the stringer with respect to the skin can be performed based on a through-hole formed in the skin and a through-hole formed in the frame or the stringer. It is also possible to unite the skin and the frame or the skin and the stringer together by inserting a temporary fastening rivet into the through-hole formed in the skin and the through-hole formed in the frame or the stringer and fastening the skin and the frame or the stringer together. It should be noted that the through-holes are holes formed to penetrate the skin and the frame or the stringer, and can be used for positioning when attaching the frame or the stringer to the skin, and also allow insertion of the rivet.

A case where a through-hole is formed in a frame among members constituting an aircraft component will be described below.

Figure 1:
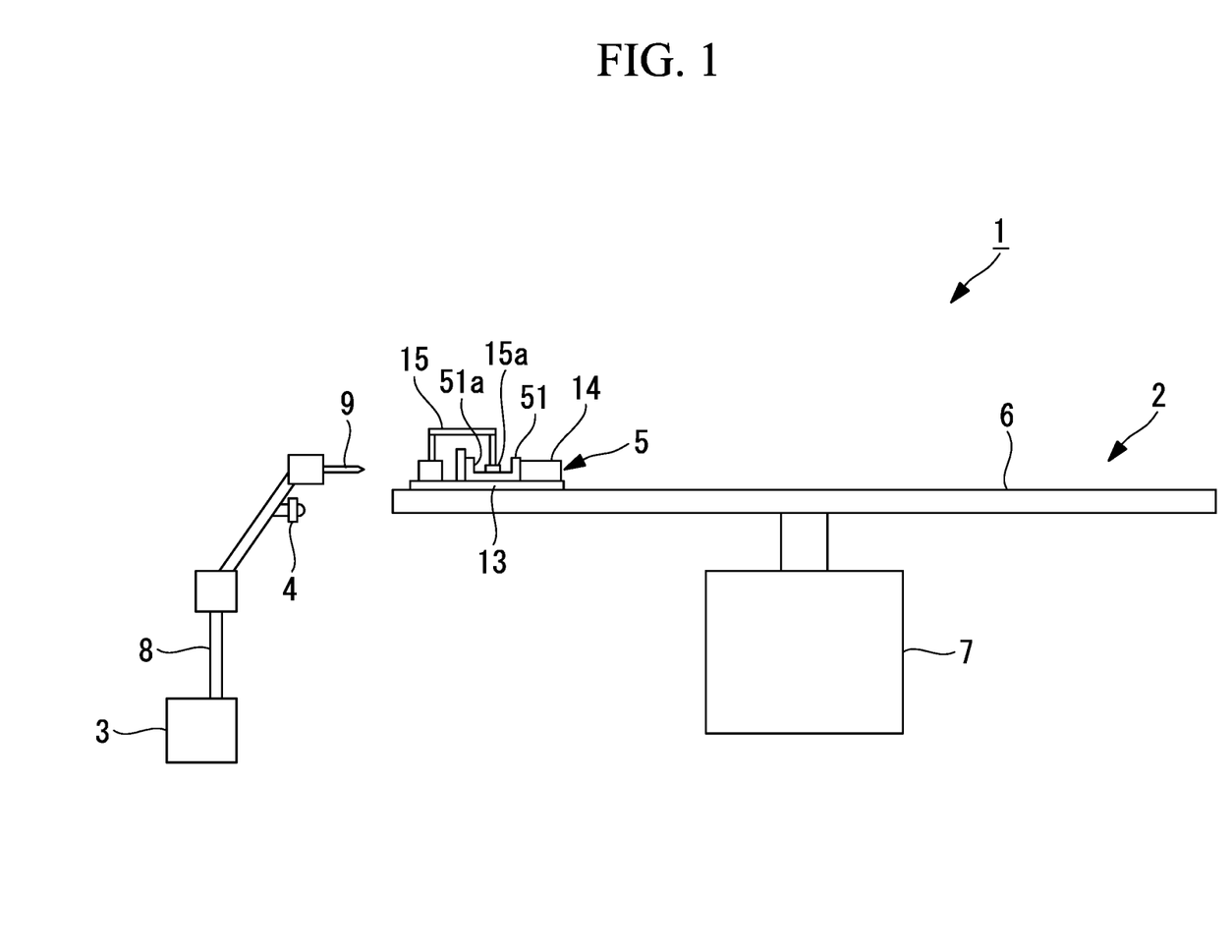
FIG. 1 is a schematic front view showing an aircraft component production system according to one embodiment of the present invention.
Figure 2:
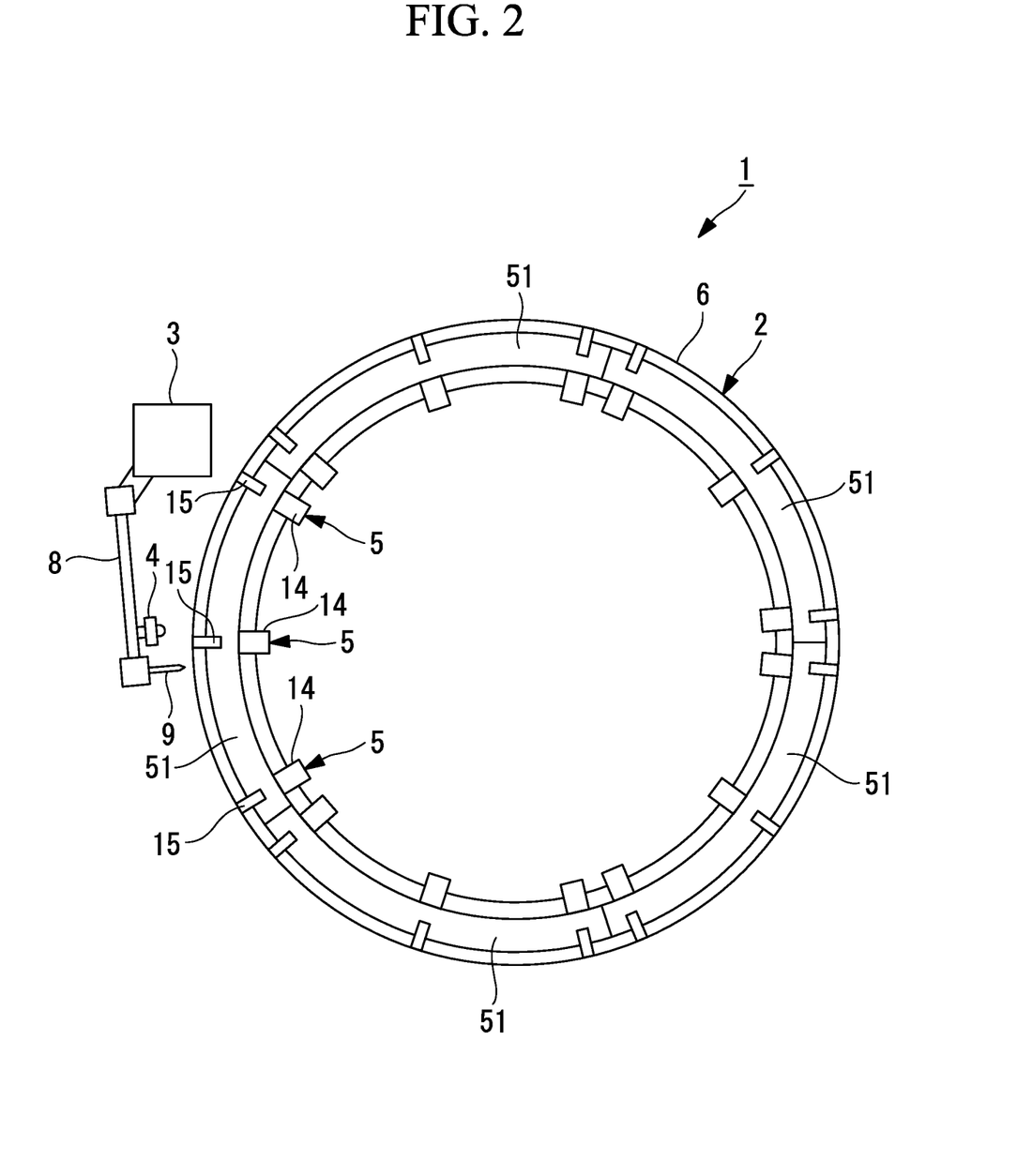
FIG. 2 is a schematic plan view showing the aircraft component production system according to one embodiment of the present invention.

As shown in FIGS. 1 and 2, the aircraft component production system 1 includes a turntable 2 on which a frame 51 that is a long member to be machined is placed, a machining robot 3 for performing a hole-making operation on the frame 51, a distance sensor 4 for detecting the position of the frame 51 placed on the turntable 2, a plurality of support devices 5 for supporting the frame 51, etc.

The turntable 2 has a circular table portion 6 on which the frame 51 is placed, a drive unit 7 for rotating the table portion 6 about the central axis of the table portion 6, etc. For example, the turntable 2 is driven under additional axis control of the machining robot 3, and positioning in a rotational direction is accurately performed. The frame 51 is a member having an arc shape as described above. Since the frame 51 is a member to be arranged along the circumferential direction of the aircraft fuselage, when a plurality of, for example, five frames 51 are mounted on the skin, the frames 51 are in the shape of a circle. In the present embodiment, since the plurality of frames 51 are placed on the table portion 6 to agree with this mount state, the table portion 6 has a circular shape.

It should be noted that the present invention is not limited to the case where the table portion is in the shape of a circle. For example, the table portion may have an arc shape capable of placing only one or several frames 51 thereon. At this time, although the table portion is not circular in shape, if the table portion is configured to rotate about the central axis of the circular arc, the frame 51 is movable along the circumferential direction.

The machining robot 3 has an arm 8, and a drill 9, attached at the distal end of the arm 8, for making a hole in the frame 51. For example, the machining robot 3 causes the drill 9 to approach the frame 51 placed on the turntable 2 and penetrate a flange portion 51a of the frame 51 in a perpendicular direction. The machining robot 3 is controlled by a control unit 10.

Figure 3:
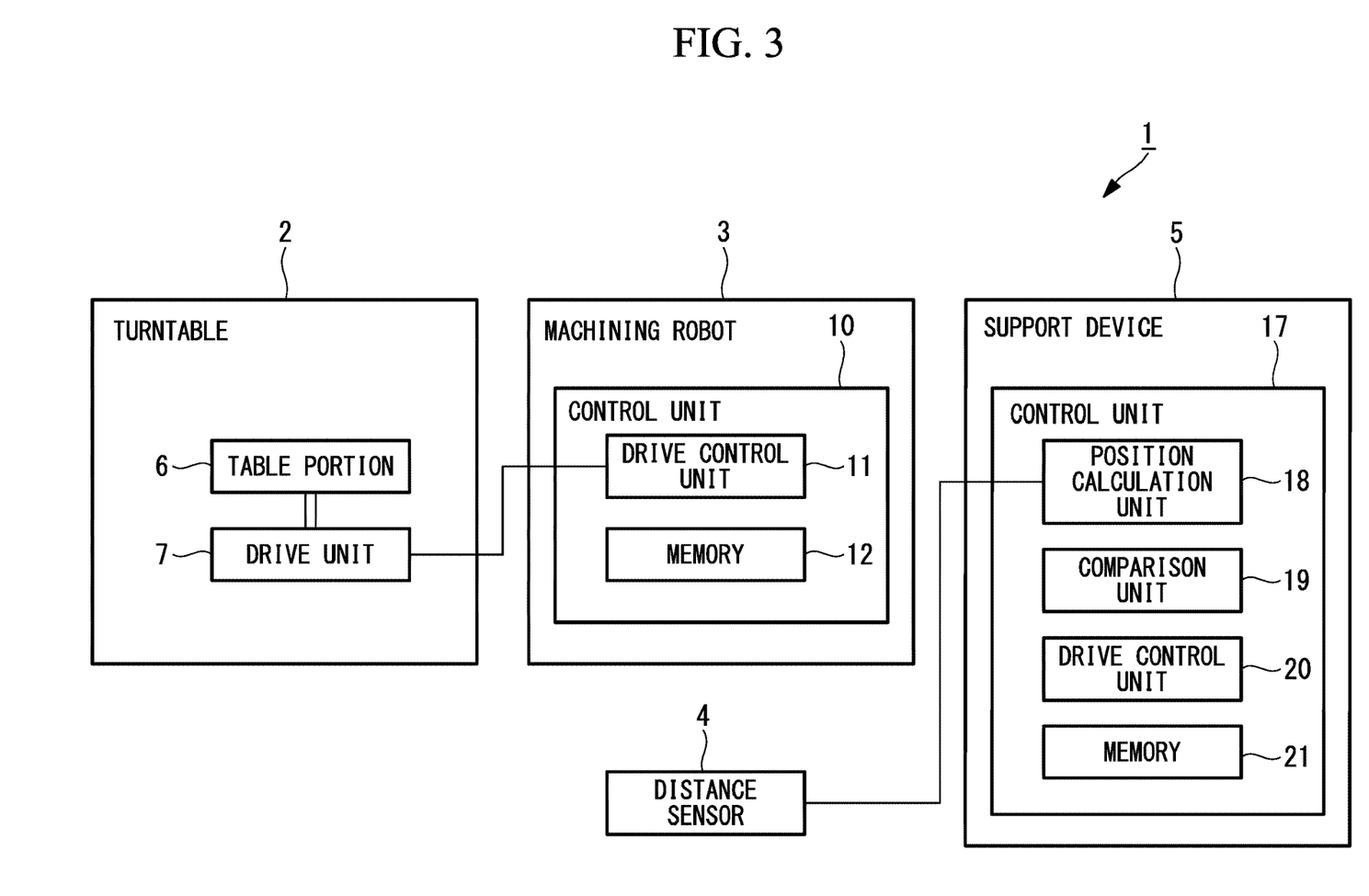
FIG. 3 is a block diagram showing the aircraft component production system according to one embodiment of the present invention.

As shown in FIG. 3, the control unit 10 of the machining robot 3 includes a drive control unit 11, a memory 12, etc. The operation of the control unit 10 is realized by executing a prerecorded program with a hardware resource such as a CPU.

Based on data about the machining position prerecorded in the memory 12, the drive control unit 11 drives the arm 8 of the machining robot 3 and moves the arm 8 to the prerecorded machining position. Then, the drill 9 of the machining robot 3 penetrates the frame 51 to form a through-hole in the frame 51.

The distance sensor 4 measures information about the shape of the frame 51 placed on the turntable 2, for example, the radial position of a predetermined portion of an outer circumferential surface of the frame 51. The distance sensor 4 is mounted outside the table portion 6 of the turntable 2, for example, on the arm 8 of the machining robot 3 or the arm of other robot.

A support device 5 is mounted on the table portion 6 of the turntable 2. The frame 51 is supported by the support device 5, and is fixed to the table portion 6 when the support device 5 fixes the frame 51. The table portion 6 is connected to the drive unit 7, and is rotated about the rotational axis by the drive unit 7. The drive unit 7 is driven under the additional axis control of the machining robot 3, and rotates the table portion 6.

Figure 4:
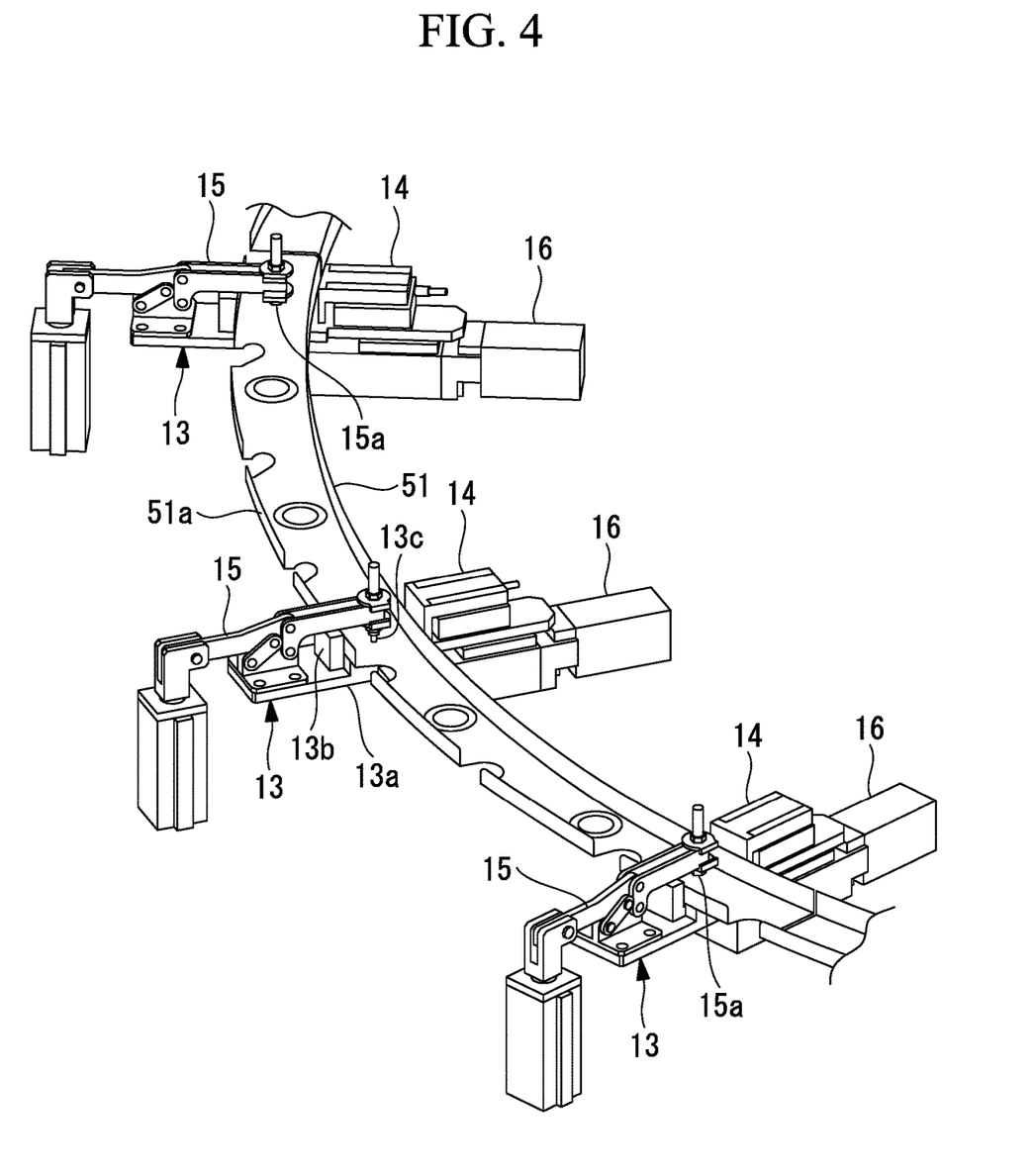
FIG. 4 is a perspective view showing support devices and a frame in the aircraft component production system according to one embodiment of the present invention.

For one piece of frame 51, a plurality of support devices 5 are arranged along the frame 51 having a long curvature. The plurality of support devices 5 are arranged spaced apart from each other and support the frame 51. As shown in FIG. 4, each support device 5 includes a base 13, a first clamp 14, a second clamp 15, a servo slider 16, a control unit 17, etc.

Figure 5:
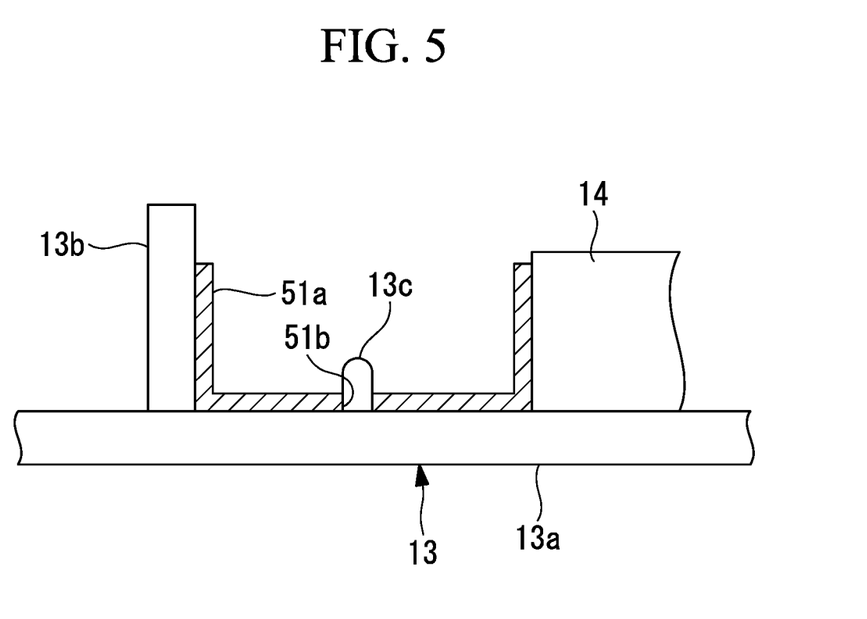
FIG. 5 is a partially enlarged vertical sectional view showing a base of the support device and the frame in the aircraft component production system according to one embodiment of the present invention.

As shown in FIGS. 4 and 5, the base 13 includes a horizontal plate portion 13a in the form of a plate capable of placing the frame 51 thereon, a perpendicular plate portion 13 in the form of a plate standing in a direction perpendicular to the horizontal plate portion 13a, and a positioning pin 13c in the form of a pin standing in a direction perpendicular to the horizontal plate portion 13a. The horizontal plate portion 13a sandwiches the frame 51 together with the second clamp 15 from up and down directions. The perpendicular plate portion 13b sandwiches the frame 51 together with the first clamp 14 from horizontal directions. The base 13 is movable in a radial direction of the frame 51 by the servo slider 16. As shown in FIG. 5, the positioning pin 13c is insertable into a pin hole 51b formed in the frame 51 in advance. By inserting the positioning pin 13c into the pin hole 51b, the position of the frame 51 in the circumferential direction on the turntable 2 is determined.

The positioning pin 13c is formed only on the base 13 of one support device 5 mounted at a substantially center portion in the circumferential direction, among the plurality of support devices 5 arranged in the circumferential direction. Hence, when the support devices 5 change the support position of the frame 51, it is possible to deform the frame 51 on the basis of the substantially center portion of the frame 51.

The first clamp 14 is configured to be capable of sandwiching an outer circumferential side edge portion and an inner circumferential side edge portion of the frame 51 in cooperation with the perpendicular plate portion 13b of the base 13. The first clamp 14 is movable in a horizontal direction, that is, a radial direction of the frame 51, by, for example, air pressure or the like. When the first clamp 14 contacts the frame 51, the movement of the frame 51 in the radial direction is constrained.

If the clamping force with respect to the frame 51 is decreased, the first clamp 14 can guide both side edge portions of the frame 51 along the circumferential direction of the frame 51. Accordingly, when the support position of the frame 51 is changed by the support device 5, the frame 51 is guided along the first clamp 14, and it is possible to prevent the frame 51 from being deformed in a direction different from the original shape due to application of excessive force.

Moreover, by increasing the clamping force with respect to the frame 51, the first clamp 14 can sandwich both side edge portions of the frame 51 and fix the frame 51. Hence, the frame 51 is fixed by sandwiching both side edge portions of the frame 51 with the first clamp 14, and it is possible to prevent movement and deformation of the frame 51 during machining.

The second clamp 15 is configured to be capable of sandwiching one side surface of the frame 51 and another side surface opposite to the one side surface in cooperation with the horizontal plate portion 13a of the base 13. A contact portion 15a of the second clamp 15 is movable in a perpendicular direction, that is, the up-down direction, by air pressure or the like. When the second clamp 15 contacts the frame 51, the movement of the frame 51 in the up-down direction is constrained.

If the clamping force with respect to the frame 51 is decreased, the second clamp 15 can guide the upper surface and the lower surface of the frame 51 along the circumferential direction of the frame 51. Accordingly, when the support position of the frame 51 is changed by the support device 5, the frame 51 is guided along the second clamp 15, and it is possible to prevent the frame 51 from being deformed in a direction different from the original shape due to application of excessive force.

Moreover, by increasing the clamping force with respect to the frame 51, the second clamp 15 can sandwich the upper surface and the lower surface of the frame 51 and fix the frame 51. Hence, the frame 51 is fixed by sandwiching the upper and lower surfaces of the frame 51 with the second clamp 15, and it is possible to prevent movement and deformation of the frame 51 during machining.

The servo slider 16 is connected to the base 13, and is configured to be capable of moving the base 13, the first clamp 14 and the second clamp 15 in the radial direction of the frame 51. Accordingly, when the frame 51 is bound by the first clamp 14 and the second clamp 15, the position where the frame 51 is supported can be moved in the radial direction. As a result, the shape of the frame 51 supported by the support device 5, that is, the actual radius (curvature) of the frame 51 can be changed.

As shown in FIG. 3, the control unit 17 includes a position calculation unit 18, a comparison unit 19, a drive control unit 20, a memory 21, etc. The operation of the control unit 17 is realized by executing a prerecorded program with a hardware resource such as a CPU.

Based on the distance to the frame 51 acquired by the distance sensor 4, the position calculation unit 18 calculates a radial position of a predetermined portion of the outer circumferential surface of the frame 51. The predetermined portion of the outer circumferential surface of the frame 51 to be measured is prerecorded in the memory 21.

The comparison unit 19 compares data about the shape of the frame 51 (for example, designed data) prerecorded in the memory 21 and data about the radial position of the predetermined portion of the outer circumferential surface of the frame 51 calculated by the position calculation unit 18. Consequently, it is possible to confirm whether or not the frame 51 that is actually supported by the support devices 5 matches the designed data.

The drive control unit 20 drives the servo sliders 16 so that the frame 51 supported by the support device 5 matches the designed data. When the radius of the frame 51 supported by the support devices 5 is smaller than the designed data, the servo sliders 16 of the plurality of support devices 5 are moved coordinately so that the radius of the frame 51 is increased to be close to the shape of the designed data. On the contrary, when the radius of the frame 51 supported by the support devices 5 is larger than the designed data, the servo sliders 16 of the plurality of support devices 5 are moved coordinately so that the radius of the frame is decreased to be close to the shape of the designed data.

The drive control unit 20 stops driving the support devices 5 in a state in which the data about the radial position of the predetermined portion of the outer circumferential surface of the frame 51 calculated by the position calculation unit 18 matches the designed data of the frame 51. Hence, the support device 5 can fix the frame 51. At this time, the first clamp 14 and the second clamp 15 increase the clamping forces with respect to the frame 51.

In addition to the servo slider 16, the support device 5 has a structure enabling the support device 5 itself to move in a radial direction of the turntable 2. As described above, there are a plurality of types of shapes for the shape of the frame 51 to be placed on the support devices 5. Therefore, before placing the frame 51 on the support devices 5, the mount positions of the support devices 5 are changed according to the shape of the frame 51 (the radius of the frame 51). Consequently, even when supporting a frame in a different shape, it is possible to support the frame 51 by changing the mount positions of the support devices 5.

Figure 6:
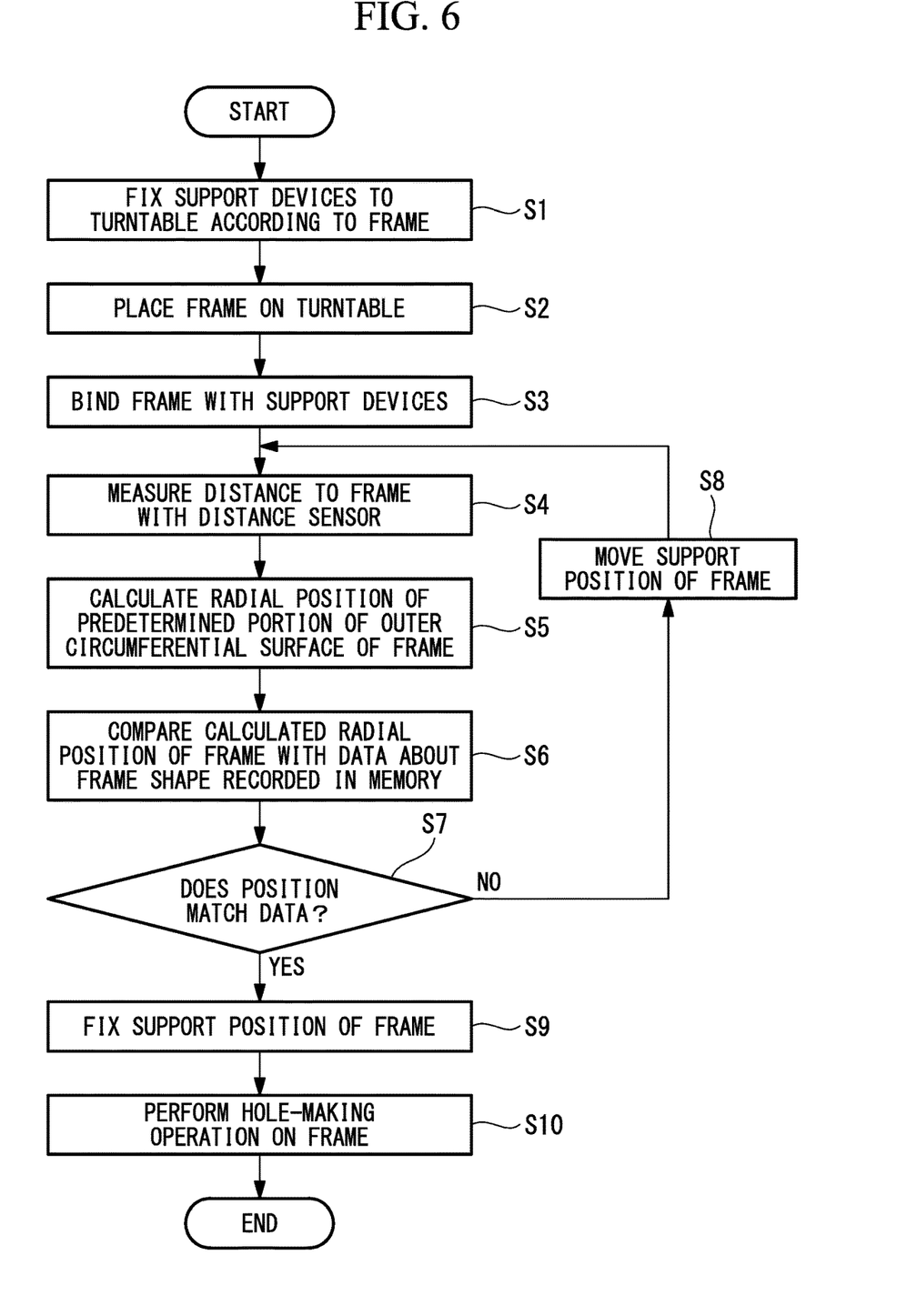
FIG. 6 is a flowchart showing an aircraft component production method using the aircraft component production system according to one embodiment of the present invention.

Next, with reference to FIG. 6, an aircraft component production method using the aircraft component production system 1 according to one embodiment of the present invention will be described.

First, each support device 5 is moved to an appropriate position corresponding to the shape of the frame 51 to be machined, and the support device 5 is fixed with respect to the turntable 2 (step S1). Then, the frame 51 is placed on the turntable 2 (step S2). At this time, in order to facilitate the placing of the frame 51 on the base 13, the first clamp 14 and the second clamp 15 of the support device 5 are retracted to positions of not interfering with the frame 51. When placing the frame 51 on the base 13, the positioning pin 13c formed on the base 13 is inserted into the pin hole 51b formed beforehand in the frame 51 (see FIG. 5).

After placing the frame 51 on the base 13, the support device 5 binds the frame 51 (step S3). At this time, the first clamp 14 and the second clamp 15 sandwich the frame 51 with relatively weak forces. Hence, when the support position of the frame 51 is changed by the support device 5, the frame 51 can slide along the first clamp 14 and the second clamp 15.

Then, the distance to the frame 51 placed on the turntable 2 is measured using the distance sensor 4 (step S4). At this time, for example, the radial position of the predetermined portion of the outer circumferential surface of the frame 51 supported by the support device 5 is measured along with the outer circumferential surface of the turntable 2. Accordingly, the radial position of the predetermined portion of the outer circumferential surface of the frame 51 can be calculated from the deviation in the radial direction with respect to the outer circumferential surface of the turntable 2.

The measurement result by the distance sensor 4 is transmitted to the control unit 17. In the position calculation unit 18 of the control unit 17, the radial position of the predetermined portion of the outer circumferential surface of the frame 51 is calculated based on the distance to the frame 51 acquired by the distance sensor 4 (step S5). Then, the data about the shape of the frame 51 (for example, the designed data) prerecorded in the memory 21 is compared with the data about the radial position of the predetermined portion of the outer circumferential surface of the frame 51 calculated by the position calculation unit 18 (step S6). Then, based on the comparison result, a judgement is made as to whether or not the data about the shape of the frame 51 and the data about the calculated actual position of the frame 51 match each other (step S7).

If these pieces of data do not match each other, in order to correct the deviation, the servo slider 16 is driven to change the position where the frame 51 is supported and to change the shape of the frame 51 (step S8). The measurement of the distance to the frame 51, the calculation of the position of the frame 51 and the driving of the servo slider 16 continue until the data about the shape of the frame 51 and the calculated actual position of the frame 51 match each other.

Then, when the data about the shape of the frame 51 and the data about the calculated actual position of the frame 51 match each other, it is possible to make a judgement that there is no deviation, and therefore the driving of the servo slider 16 is stopped and the position where the frame 51 is supported is fixed (step S9).

Then, in a state in which the frame 51 is fixed in the same shape as designed at the time of designing, the hole-making operation is performed on the frame 51 using the machining robot 3 (step S10). As a result, since the frame 51 placed on the turntable 2 is fixed in the same shape as that designed at the time of designing, the positional accuracy of the through-hole to be formed in the frame 51 by the hole-making operation is improved.

In this work, a plurality of through-holes to be formed in mutually close proximity in the frame 51 may be predetermined as one group, and when machining is completed for one group, machining for the next group may be started by rotating the turntable 2. By rotating the turntable 2, a place where the through-hole is to be formed in the frame 51 can be brought closer to the machining robot 3, thereby improving the machining accuracy. Instead of performing machining on a group-by-group basis, every time one through-hole is formed, a place in the frame 51 where a through-hole is to be formed may be brought closest to the machining robot 3 by rotating the turntable 2.

As described above, according to the present embodiment, when forming a through-hole in an arc-shaped component such as the frame 51, it is possible to bring the actual frame 51 supported by the support device 5 into a shape matching the designed shape. Therefore, the through-hole can be highly accurately formed in the frame 51. Even when the positioning of a place where a through-hole is to be formed is difficult due to low production accuracy of the frame 51 itself, the positional accuracy of a through-hole to be formed in the frame 51 is increased by making the shape of the frame 51 agree with the designed shape by the above-described method of the present embodiment.

Further, even when the shape of the frame 51 is different, that is, even when the curvature of the frame 51 is different, the mount position of each support device 5 (the position in the radial direction of the frame) just needs to be changed. Therefore, according to the present embodiment, unlike the conventional case, it is not necessary to prepare in advance many types of fixing jigs corresponding to the shapes of the frames 51 when forming through-holes, thereby reducing the number of jigs. Furthermore, for the production of many types of frames 51, the present embodiment is also applicable to the automation of the production process.

REFERENCE SIGNS LIST

1 Aircraft component production system
2 Turntable
3 Machining robot

4 Distance sensor
5 Support device
6 Table portion
7 Drive unit
8 Arm
9 Drill
10 Control unit
11 Drive control unit
12 Memory
13 Base
13a Horizontal plate portion
13b Perpendicular plate portion
13c Positioning pin
14 First clamp
15 Second clamp
15a Contact portion
16 Servo slider
17 Control unit
18 Position calculation unit
19 Comparison unit
20 Drive control unit
21 Memory
51 Frame
51a Flange portion
51b Pin hole

The invention claimed is:

1. A component production method comprising:
a step of supporting a first member by a plurality of support parts, arranged spaced apart from each other along the first member, each of the plurality of support parts comprising a base having a horizontal plate portion and a perpendicular plate portion, a first clamp movable in a horizontal direction, a second clamp having a contact portion movable in an up-down direction, a slider, and a control;
a step of detecting, by a sensor, information about a shape of the first member supported by the plurality of support parts;
a step of moving using a drive control, based on the information about the shape of the first member detected by the sensor and shape data of the first member prerecorded in a memory, the drive control drives each of the sliders to move the plurality of support parts to support positions where the first member is supported so that the first member supported by the plurality of support parts matches the shape data of the first member;
a step of fixing the first member in a state in which the information about the shape of the first member detected by the sensor matches the shape data of the first member; and
a step of performing machining with respect to the fixed first member.

2. The component production method according to claim 1, further comprising, before the step of supporting the first member by the plurality of support parts, a step of changing mount positions of the plurality of support parts.

3. The component production method according to claim 1, further comprising:
a step of guiding first and second side surfaces of the first member or upper and lower surfaces of the first member along a circumferential direction of the first member by the first and second clamps of each of the plurality of support parts; and
a step of fixing the first member by sandwiching both the first and second side surfaces of the first member or the upper and lower surfaces of the first member by the first and second clamps of each of the plurality of support parts.

4. A component production system comprising:
a plurality of support parts arranged spaced apart from each other along a first member and supporting the first member, each of the plurality of support parts comprising a base having a horizontal plate portion and a perpendicular plate portion, a first clamp movable in a horizontal direction, a second clamp having a contact portion movable in an up-down direction, a slider, and a control;
a sensor for detecting information about a shape of the first member supported by the plurality of support parts;
a memory in which shape data of the first member is prerecorded;
a drive control for moving, based on the information about the shape of the first member detected by the sensor and the shape data of the first member prerecorded in the memory, the drive control drives each of the sliders to move the plurality of support parts to support positions where the support parts support the first member, so that the first member supported by the plurality of support parts matches the shape data of the first member; and
a machining robot for performing machining with respect to the first member, wherein
the drive control stops moving of the plurality of support parts in a state in which the information about the first member detected by the sensor matches the shape data of the first member, and the plurality of support parts fixes the first member.

* * * * *